Dec. 2, 1958 W. R. MACLAY ET AL 2,863,004

APPARATUS FOR MANIFESTING INTELLIGENCE ON RECORD MEDIA

Filed Dec. 9, 1955 3 Sheets-Sheet 1

INVENTORS,
WILLIAM R. MACLAY
GEORGE W. SCOTT

BY Dewey J. Cunningham
ATTORNEY

APPARATUS FOR MANIFESTING INTELLIGENCE ON RECORD MEDIA

Filed Dec. 9, 1955 3 Sheets-Sheet 2

INVENTORS,
WILLIAM R. MACLAY
GEORGE W. SCOTT
BY
Dewey J. Cunningham
ATTORNEY

Dec. 2, 1958 W. R. MACLAY ET AL 2,863,004

APPARATUS FOR MANIFESTING INTELLIGENCE ON RECORD MEDIA

Filed Dec. 9, 1955 3 Sheets-Sheet 3

INVENTORS,
WILLIAM R. MACLAY
GEORGE W. SCOTT
BY
Dewey J. Cunningham
ATTORNEY

United States Patent Office 2,863,004

Patented Dec. 2, 1958

2,863,004

APPARATUS FOR MANIFESTING INTELLIGENCE ON RECORD MEDIA

William R. Maclay and George W. Scott, Endicott, N. Y., assignors to International Business Machines Corporation, New York, N. Y., a corporation of New York Application December 9, 1955, Serial No. 552,005

12 Claims. (Cl. 179—100.2)

This invention relates to apparatus for manifesting intelligence, and particularly to transducer components thereof which are responsive to data signals for producing intelligence patterns upon a record medium, or which are responsive to intelligence patterns recorded upon a record medium for producing data signals.

Much use is made of magnetizable record media in present day computers. Magnetic transducer devices associated with magnetizable media such as magnetic tapes, discs or drums are adapted to be mounted closely adjacent a magnetizable surface thereof. The transducer should be as close as possible to the magnetizable medium without touching it during the recording or reading operation. It is conventional practice to mount the transducer device in fixed relation to the magnetizable medium. However, because of fabricating difficulties in producing the medium it is quite difficult to obtain uniform signal amplitudes from areas already magnetized or to provide uniform magnetization of the medium during the recording operation. The cost of fabricating increases considerably with increased precision.

In the past, it has been proposed to utilize a transducer in which air is supplied thereto under pressure and is exhausted therefrom through orifices opening onto the surface of the transeducer disposed adjacent the record medium. The escaping air provides a thin film between the transducer and the record medium which supports the transducer out of engagement with the medium. This type of apparatus is disclosed in copending application Serial No. 406,011, entitled "Air Head," which was filed January 25, 1954, in the name of W. A. Goddard. Another arrangement which has been proposed is to support the entire transducer assembly including the coil and core on a shoe which is supported by the laminar boundary of air adjacent the moving record medium. This invention is disclosed in copending application Serial No. 406,448, entitled "Recording Support Devices," which was filed January 27, 1954, in the name of H. K. Baumeister. The present invention is an improvement over that disclosed in the Baumeister application.

An object of the present invention is to provide an improved intelligence manifesting apparatus.

Another object of this invention is to furnish an improved transducer apparatus in which the sensing portion thereof is supported by the laminar film of fluid adhering to a moving record medium associated with said transducer apparatus.

Still another object of the invention is to furnish transducer apparatus for association with a record medium, the signal pickup and recording portion of said transducer apparatus being supported for movement substantially perpendicular to said record medium.

A further object of this invention is to furnish a magnetic recording and reading head which includes a stationary coil and a movable core in which the core is supported on a shoe which is maintained away from a moving record medium associated therewith by the laminar film of fluid which adheres to the moving record medium.

A still further object of the present invention is to furnish a transducer apparatus in which the pickup and recording portion thereof is resiliently urged toward a moving record medium associated therewith but maintained in spaced relation therefrom by the laminar boundary of fluid adjacent the moving record medium.

Another object of the invention is to provide an improved magnetic drum read and write head which compensates for runout on the drum and allows the use of a drum which is not nearly so precise as conventional drums.

Another object is to provide a magnetic drum head usable at different head locations on the drum which produces relatively high constant level signals from intelligence recorded on the drum even though temperature changes may cause the drum to expand differently at the different head locations.

Another object of the invention is to provide a magnetic drum read head which has an extremely high reliability due to its ability to automatically adjust itself to a substantially constant spaced relation with the drum and one which resists vibration in a manner much better than conventional heads.

Another object of the present invention is to provide a magnetic drum head as described above which allows greater magnetic spot packing due to the very close relationship which the pickup and recording portion possesses relative to the magnetizable record medium.

Other objects of the invention will be pointed out in the following description and claims and illustrated in the accompanying drawings, which disclose, by way of examples, the principle of the invention and the best mode, which has been contemplated, of applying that principle.

Briefly, the present invention comprises a transducer assembly which, in the embodiments illustrated, comprises a housing within which a stationary coil is furnished. The center of the coil has an aperture to receive one leg of a laminated core, which leg is mounted for movement relative to the coil. The other leg of the core is mounted within the housing so as to allow a gap between the two legs to move substantially perpendicular to the record medium with which the transducer is associated. In the preferred embodiment a parallel linkage is used for supporting the core within the housing. In the other embodiment, the core is pivoted directly to the housing.

Figures 1, 2, 3:
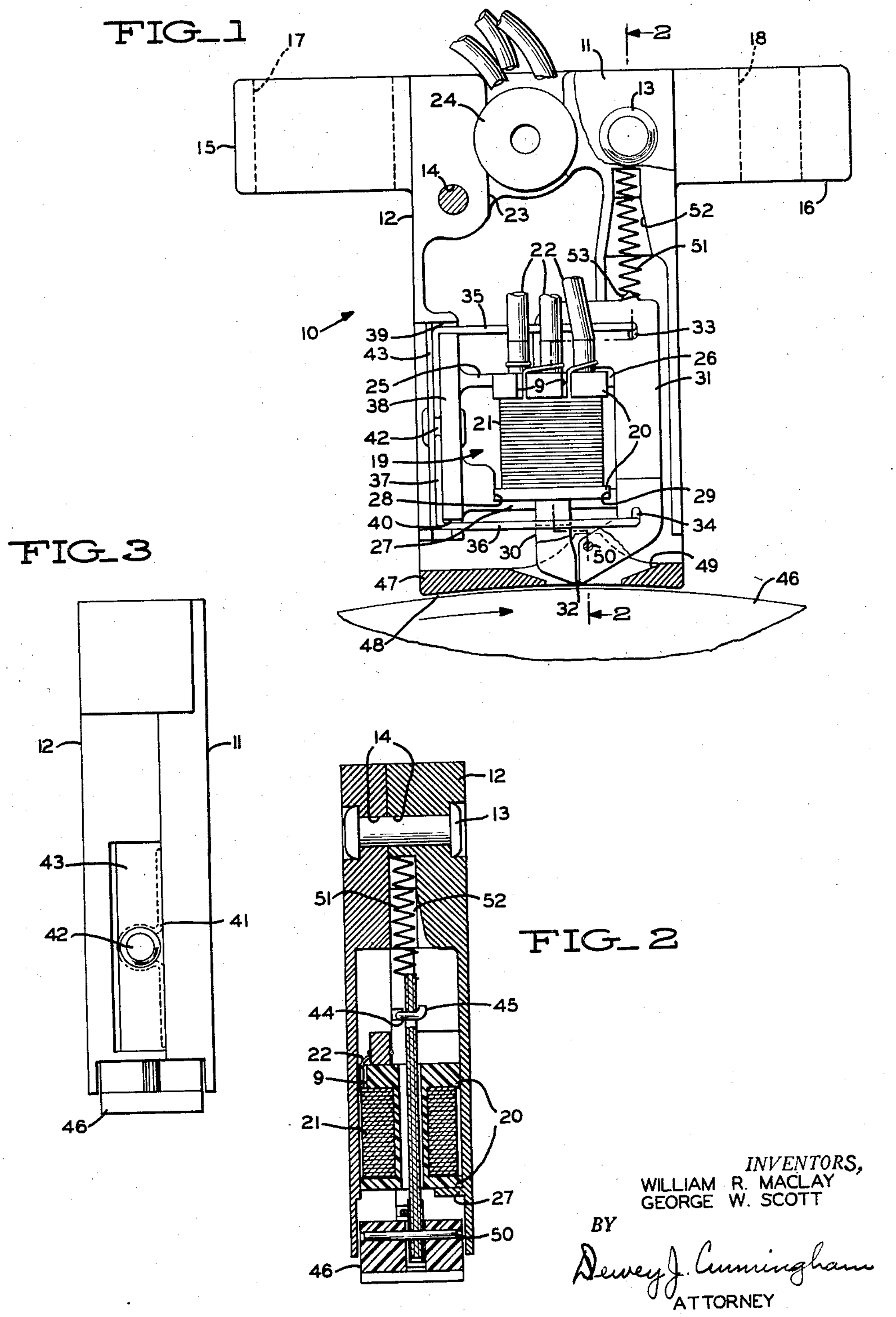
Fig. 1 is a front elevation of a preferred embodiment of the present invention, the cover being broken away to show the detailed construction thereof.
Fig. 2 is a sectional view taken on line 2—2 of Fig. 1.
Fig. 3 is a view of the left side of the head shown in Fig. 1.

For a more detailed description of the invention, reference is now made to Figs. 1 through 3 which illustrate the preferred embodiment. The entire transducer assembly is illustrated by reference numeral 10 and is shown to comprise a housing formed from castings 11 and 12. These castings are of nonmagnetic material and are adapted to be secured together by rivets 13 (only one being shown) which pass through apertures 14 in each casting. It should be pointed out that the two halves of the housing need not be in the form of castings, although the casting method of producing them offers some advantage over other methods. The material used may be a nonmagnetic metal such as aluminum or a suitable plastic.

Casting 12 is provided with arms 15 and 16 which are integral with opposite sides thereof. These arms are adapted to be used in mounting the head on a framework (not shown) which is normally fixedly mounted adjacent the record medium. Attachment of the arms to the framework may be by way of stud bolts (not shown) which pass through apertures 17 and 18.

The coil assembly 19 of the transducer assembly is adapted to be mounted within the housing in fixed relation thereto and is seen to comprise a bobbin 20, which is constructed of an insulating material, and a plurality of coils of insulated wire illustrated by reference numeral 21. Appropriate wire leads 22 are adapted to be connected to desired points of coils 21. As shown in Fig. 1, the upper end of the bobbin has slots 9 therein to allow the leads to pass to the coils. Leads 22 are allowed to extend from the housing through a passage 23 in casting 12. In order to assure that the leads are not disconnected from the coil by accidental pulling, a rubber pad 24 is furnished within the passage which presses the leads firmly against one-half of the housing.

Each end of the bobbin 20 is of rectangular configuration as seen from the top of Fig. 1. The upper end is adapted to fit between a boss 25 on the left side of casting 12 and an L-shaped boss 26 on the right side of casting 12. Thus, it will be seen that the upper end of the bobbin is restrained from movement laterally and upwardly. One edge of the lower end of the bobbin rests on a rib 27 which is integral with the lower end of casting 12. Shoulders 28 and 29 are formed at the opposite ends of rib 27 to prevent lateral movement of the lower end of the bobbin, the rib itself preventing downward movement of the bobbin. It will be seen in Fig. 2 that the two-halves of the housing engage the front and back edges of the upper and lower ends of the bobbin to prevent it from being dislodged from the various bosses, ribs and shoulders.

A laminated core structure comprising legs 30 and 31 is provided for association with coil assembly 19. Leg 30 is adapted to extend through the hollow central portion of the bobbin 20. Both legs 30 and 31 are illustrated as being integral and the free ends thereof provide a gap 32 which may be filled with a nonmagnetic material such as silver or solder.

Figure 9:
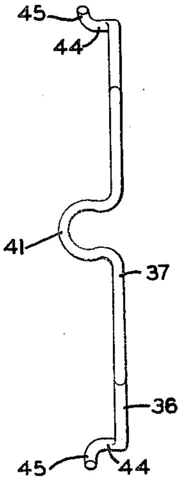
Fig. 9 is a left end view of Fig. 8.

Leg 31 of the laminated core structure is furnished with elongated apertures 33 and 34 which are adapted to receive the ends of legs 35 and 36, respectively, of a U-shaped supporting element. The base of this supporting element is illustrated by reference numeral 37 and is adapted to rest against a vertically extending rib 38 which is formed in casting 12. The end portions of legs 35 and 36 adjacent the base 37 are adapted to fit in slots 39 and 40 at each end of the rib 38. In order to secure the entire U-shaped element in place, a loop 41 which is best illustrated in Fig. 9 is formed intermediate the ends of base 37 and is adapted to receive a rivet 42. This rivet passes through an aperture (not shown) in rib 38 and an aperture (not shown) in cover plate 43. It will be seen that cover plate 43 is substantially the same length as the base 37, thereby rigidly securing the base in the housing. As shown best in Figs. 8 and 9, the U-shaped bore supporting member is formed from a length of small diameter spring wire and comprises legs 35 and 36 which are initially bent so that they form an obtuse angle relative to base 37. The end of each leg is formed with successive right angle portions 44 and 45, portions 45 extending in opposite directions on legs 35 and 36. The arrangement is such that by bringing legs 35 and 36 substantially parallel, portions 45 may enter and pass through the elongated apertures 33 and 34 of the core structure. Then, by releasing the legs, portions 44 and 45 engage the core, as shown in Figs. 2 and 7.

Figure 7:
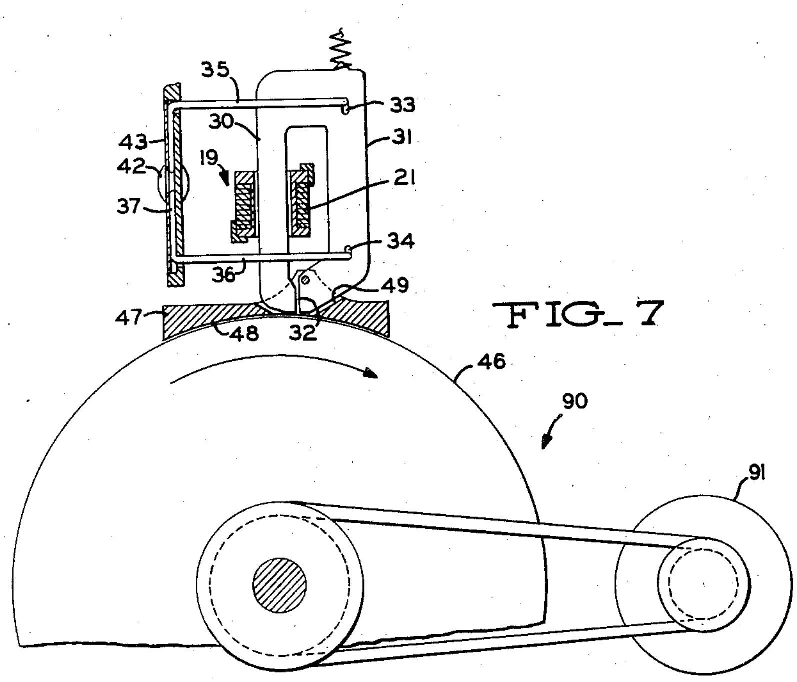
Fig. 7 shows a portion of the transducer assembly of the preferred embodiment and its association with a magnetic drum.
Figure 8:
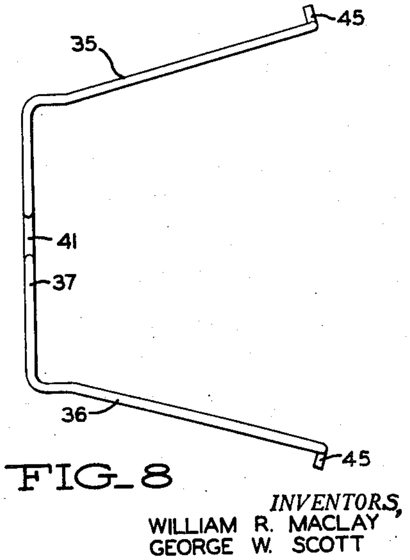
Fig. 8 is a view of the U-shaped supporting element used in the preferred embodiment.

Fig. 7 shows quite clearly how the laminated core structure is mounted so that it may move relative to the coil assembly 19 in a direction perpendicular to the recording surface 46. By using the parallel supporting legs 35 and 36, the gap 32 has practically no component of movement along the surface 46 as it moves relative to the coil to compensate for irregularities in the last-named surface.

Recording surface 46 may be that of a magnetic drum, generally illustrated by reference numeral 90 in Fig. 7. Rotation of the drum at a relatively high angular velocity by a suitable motor 91 creates a laminar boundary of fluid which adheres to the drum surface. It should be appreciated that the fluid boundary may be air or some other suitable medium. The creation of the laminar boundary is due to the fact that whenever a real fluid, no matter how small its viscosity, flows over a solid surface, however smooth, the layer of fluid immediately adjacent to the surface sticks to the surface without any slip whatsoever. The laminar boundary is distinguishable from the turbulent boundary by plotting the local viscosity against height above the surface. The laminar flow has a velocity gradient that is almost linear, while the turbulent flow (after a very thin laminar sublayer is surpassed) has a curved gradient. The shoe 47, which may be constructed of a nonmagnetic material such as a suitable metal or plastic, is provided with a lower surface 48 which is of the same radius of curvature as that of the surface 46. It is the surface 48 which is adapted to be supported away from the moving surface 46 by the laminar boundary which adheres to surface 46. The shoe itself may be constructed of an impregnated material such as oil impregnated plastic or other suitable materials to lessen the friction in starting the drum from a stopped condition. Shoe 47 is provided with a slot 49 centrally thereof which is adapted to receive the lower end of the laminated core structure. The lower end of leg 31 of the core structure is apertured to receive a pivot pin 50 which also passes through apertures in shoe 47 on both sides of slot 49. The position of the apertures in the core structure and shoe is such that initially the extreme lower end of the core structrue at the gap 32 projects slightly below the lower surface of the shoe. The entire head assembly is then placed in position over the drum and the drum is rotated until the lower end of the gap is worn even with surface 48. During the wearing in operation, the drum may be rotated at a less than normal angular velocity. It will be noted that the shoe 47 is restrained from moving laterally of surface 46 by the lower sides of castings 11 and 12. There is just sufficient clearance between the shoe and the said lower sides to allow the shoe to move freely perpendicular to the drum surface.

A spring 51 may be utilized to urge the shoe toward the drum surface. This spring has one end which is received by a pocket 52 in casting 12, the other end being adapted to fit over a projection 53 at the upper end of the core structure. It is possible to eliminate the need for spring 51 by pre-stressing legs 35 and 36 of the wire spring supporting element so that they will urge shoe 47 toward the drum. That is, the angle initially formed between leg 36 and base 37 may be increased so as to urge the shoe toward the drum. The amount of pressure to be applied to shoe 47 is not critical. For example, we have found that as little as one ounce and as much as six ounces of pressure may be used with very little change in signal amplitude. The use of one ounce of pressure has been found to be satisfactory. The clearance is extremely small between the shoe and the moving drum. It has been estimated as being between ten and fifty millionths of an inch.

The preferred embodiment described above quickly adjusts itself to variations in the drum surface. It has been tested with drums having a runout of as much as .010 inch and found to still produce extremely uniform signal amplitudes. If the drum should expand differently at one head location than at another head location due to differential temperature conditions, the synchronism between the intelligence being recorded or read at the two head locations is maintained. This is due to the fact that the gap of the core structure has substantially no component of motion along the surafce of the drum in the direction of drum motion. Since the laminar boundary of fluid adhering to the drum surface has only to support the shoe and the core structure, rapid adjustment of the gap to compensate for variations in the drum surface is possible. This, of course, cuts the cost of drum manufacture considerably since an extremely high price is paid for greater precision. Vibration of the entire drum has little effect on the head due to the rapid shoe adjustments. Another important advantage achieved with the present invention is the ability to use tighter magnetic spot packing on the drum without serious fringing effects. Additionally, in mounting the shoe in position, there is no need for carrying out gap height adjustment since it is obtained automatically.

Figures 4, 5, 6:
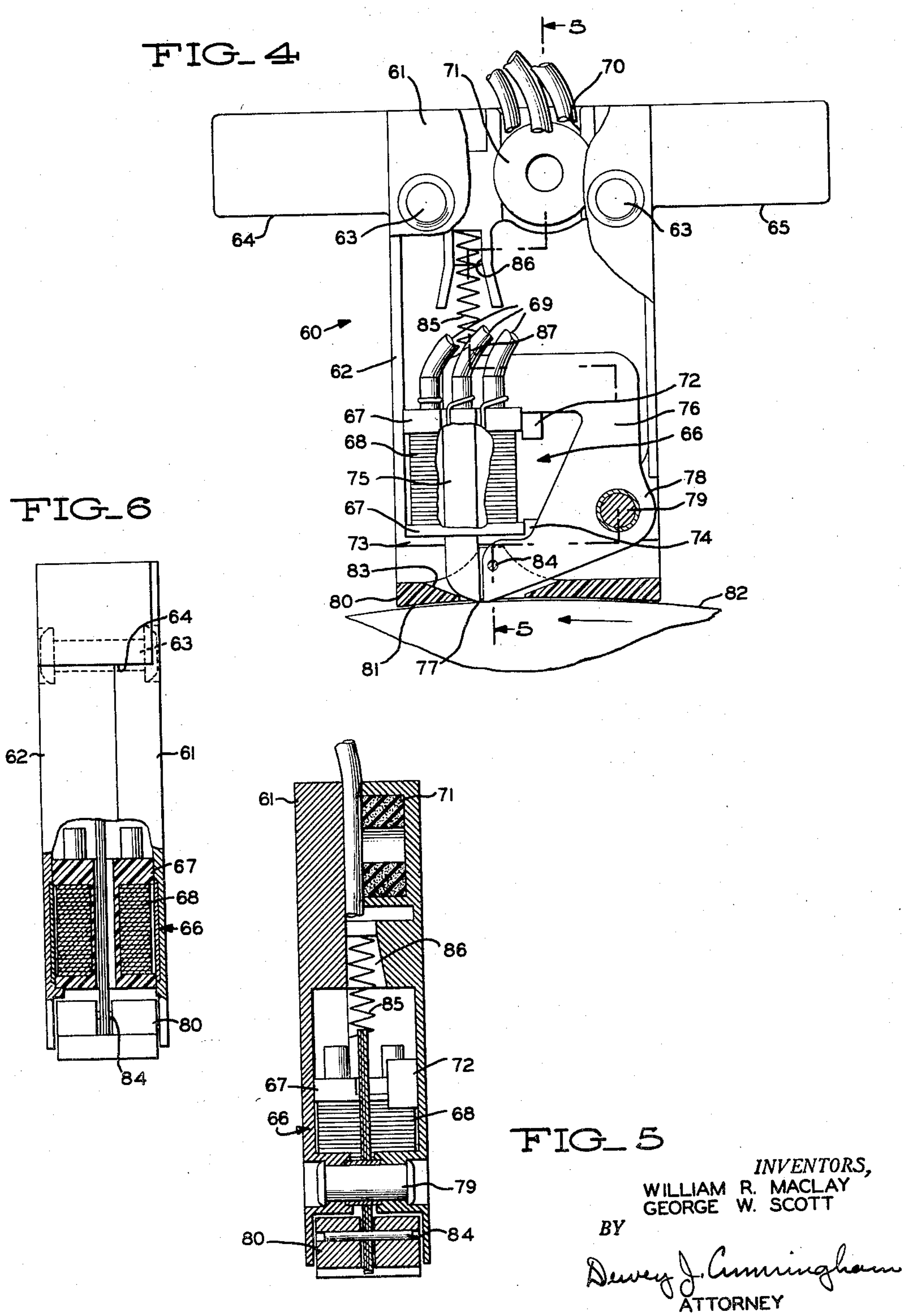
Fig. 4 is a front elevation of another embodiment of the invention, the cover being broken away to show the detailed construction thereof.
Fig. 5 is a sectional view taken on line 5—5 of Fig. 4.
Fig. 6 is a view of the left side of the embodiment shown in Fig. 4, certain portions thereof being broken away.

Referring now to Figs. 4, 5 and 6, there is illustrated a modification of the present invention. The entire transducer assembly is illustrated by reference numeral 60 and is shown to comprise a housing formed from castings 61 and 62. These castings are of nonmagnetic material and are adapted to be secured together by rivets 63 which pass through suitable apertures (not shown) in each casting.

Casting 62 is furnished with arms 64 and 65 which are integral with opposite sides thereof. As in the preferred embodiment, these arms are used for mounting the transducer assembly on a framework which is normally provided adjacent the record medium.

The coil assembly 66 of the transducer assembly is adapted to be mounted within the housing in fixed relation thereto and is seen to comprise a bobbin 67, which is constructed of an insulating material, and a plurality of coils of insulated wire illustrated by reference numeral 68. Appropriate wire leads 69 are adapted to be connected to desired points of coils 68 in a manner similar to that described with regard to the first embodiment.

As shown in Fig. 4, the upper end of the bobbin has slots therein to allow the leads to pass to the coils. Leads 69 are allowed to extend from the housing through passage 70. In order to assure that the leads are not disconnected from the coil by accidental pulling, a rubber pad 71 is utilized within the passage to firmly press the leads against one-half of the housing.

Each end of the bobbin 67 is of rectangular configuration as seen from the top of Fig. 4. The upper end is attached to fit between the left side of casting 62 and a L-shaped boss 72. Thus, it will be seen that the upper end of the bobbin is restrained from movement laterally or upwardly. One edge of the lower end of the bobbin rests on a rib 73 which is formed at the lower end of casting 62. A boss 74 and the left side of casting 62 are used to restrain the lower end of the bobbin from lateral movement, the rib 73 preventing downward movement of the bobbin. It will be seen in Figs. 5 and 6 that the two-halves of the housing engage the front and back edges of the upper and lower ends of the bobbin to prevent it from being dislodged from the various bosses and ribs.

A laminated core structure, comprising legs 75 and 76, is provided for association with coil assembly 66. Leg 75 is attached to extend through the hollow central portion of bobbin 67. Both legs 75 and 76 are illustrated as being integral and the free ends thereof provide a gap 77 which may be filled with a nonmagnetic material such as silver or solder. Leg 76 is furnished with an ear 78 which is apertured to receive a pivot pin 79 which, as seen in Fig. 5, also passes through both halves of the housing.

The shoe 80, which is constructed of nonmagnetic material, such as a suitable metal or plastic, is provided with a lower surface 81 which is of the same radius of curvature as that of the recording surface 82 associated therewith. The surface 81 is adapted to be supported away from the moving surface 82 by the laminar boundary of fluid which adheres to surface 82. Shoe 80 is provided with a slot 83 centrally thereof which is attached to receive the lower end of the laminated core structure. The lower end of leg 76 of the core structure is apertured to receive a pivot pin 84 which also passes through apertures in shoe 80 on both sides of slot 83. The gap 77 is adapted to have the same relationship to shoe 80 as the gap 32 has in relationship to shoe 47 in the Fig. 1 embodiment. The wearing away of the lower end of the core structure adjacent the gap is accomplished in the same manner as that previously described. Also the shoe 80 is restrained from moving laterally on surface 82 by the lower sides of castings 61 and 62. As in the Fig. 1 embodiment, there is just sufficient clearance between the shoe and the said lower sides to allow the shoe to move freely toward and away from the drum surface. Spring 85 may be utilized to urge the shoe toward the drum surface. This spring has one end which is received by a pocket 86 in casting 62 and another end is attached to fit over a projection 87 at the upper end of the core structure.

The difference in operation between the Fig. 1 and Fig. 4 embodiments is primarily due to the difference in the manner in which the core structure is mounted. That is, in the Fig. 1 embodiment, the core structure is mounted on a U-shaped wire spring such that the gap always moved perpendicular to the recording surface. In the Fig. 4 embodiment the gap moves on an arc about the center of pivot pin 79. In the latter case the gap is not maintained as accurately positioned as in the first embodiment during conditions of differential expansion between different head locations on the drum. However, there are many applications for which the second embodiment is usable.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for reading or writing manifestations of intelligence on a record medium, said apparatus comprising a housing which is adapted to be positioned adjacent the path of movement of said record medium, a coil assembly fixedly secured within said housing, a core operatively associated with said coil assembly, said core comprising first and second legs having a gap therebetween, means mounting said core within said housing so that said core is afforded movement relative to said coil assembly, and shoe means in engagement with said core in a manner to support said gap closely adjacent said record medium during periods of relatively rapid movement of said record medium past said gap, said shoe means having a surface which conforms to the surface of said record medium and which is supported above said record medium by the laminar fluid boundary which adheres to the surface of said record medium during said relatively rapid movement.

2. Apparatus for reading or writing manifestations of intelligence on a magnetizable record medium, said apparatus comprising a supporting means which is adapted to be positioned closely adjacent the path traversed by said record medium, coil means mounted in fixed relation to said supporting means, a sensing element operatively associated with said coil means, means mounting said sensing element for relatively free movement in relation to said coil means, and shoe means connected to said sensing element for positioning said sensing element closely adjacent and in substantially fixed relation to the path traversed by said record medium even though said path changes, said shoe means having a surface which conforms to the surface of the record medium adjacent thereto and is supported in spaced relation thereto by the laminar fluid boundary which adheres to the record medium during periods of relatively rapid movement thereof in relation to said shoe means.

3. In combination, a record medium, apparatus for manifesting intelligence on said record medium, means for mounting said apparatus adjacent said record medium, said apparatus comprising a coil assembly which is fixed with respect to the mounting means and a core structure associated with said coil assembly, means mounting said core structure for movement relative to said coil assembly, and shoe means connected to a portion of said core structure adjacent said record medium for supporting said portion in closely spaced relation to said record medium, said shoe means being constructed with a surface which is supported by the laminar boundary of fluid which adheres to the surface of said record medium during rapid movement thereof relative to said shoe means.

4. In combination, a record medium, apparatus for recording or reproducing intelligence on said record medium, support means for positioning said apparatus closely adjacent said record medium, means for causing the surface of said record medium to have relatively rapid movement past said apparatus, said apparatus including a sensing element having a portion which is adapted to be positioned closely adjacent the surface of said record medium, means mounting said sensing element on said support means for movement relative thereto and in a manner such that said portion moves in a direction substantially perpendicular to the adjacent surface of said record medium, and shoe means pivotally connected to said sensing element, said shoe means having a surface which conforms to the surface of the record medium adjacent thereto, the surface of said shoe means being supported in closely spaced relation to said record medium by the laminar fluid boundary which adheres to said medium during the relatively rapid movement thereof.

5. Apparatus for recording and reading intelligence in the form of magnetized areas on a magnetizable record medium comprising coil means and associated core structure, means mounting said core structure such that a portion thereof is positioned adjacent said record medium for movement substantially perpendicular thereto, the mounting means including supporting means having spaced apart legs, one end of each of said legs being fixed relative to said coil means, the other end of each of said legs engaging said core structure, and shoe means pivotally connected to the portion of said core structure adjacent the surface of said record, said shoe means having a surface which is complementary to the surface of said record medium adjacent thereto and which is supported in relatively fixed spaced relation to the surface of said record medium by the laminar fluid film which adheres to the surface of said record medium during rapid movement thereof relative to said shoe means.

6. In combination, a magnetizable record medium, a magnetic head, means fixedly mounting said head adjacent said record medium, means connected to said record medium for causing the surface thereof to move relatively rapidly past said magnetic head, said head comprising a housing having a coil assembly mounted therein in fixed relation thereto, a core structure having a first leg which passes through the center portion of said coil assembly and a second leg, the free ends of said first and second legs being spaced apart to form a gap therebetween, means connected to one of said legs for supporting said core structure in said housing so that said first leg is free to move relative to said coil assembly, and means supported in spaced relation to the surface of said record medium by the laminar boundary of fluid which adheres to said surface, the last-named means being pivotally connected to one of said legs adjacent said gap, said last-named means being apertured to receive the portion of said legs adjacent said gap so as to allow said gap to be closely spaced to the surface of said record medium as determined by said last-named means.

7. In combination, a magnetizable record medium, a magnetic head, means fixedly mounting said head adjacent said record medium, means connected to said record medium for causing the surface thereof to move relatively rapidly past said magnetic head, said head comprising a housing having a coil assembly mounted therein in fixed relation thereto, a core structure having a first leg which passes through the center portion of said coil assembly and a second leg, the free ends of said first and second legs being spaced apart to form a gap therebetween, spring supporting means including spaced substantially parallel arms, one end of each of said arms being connected to said housing, the other end of each of said arms being connected to the second leg of said core structure at spaced points thereof to allow said first leg to move freely relative to said coil assembly, and means supported in spaced relation to the surface of said record medium by the laminar boundary of fluid which adheres to said surface, the last-named means being pivotally connected to one of said legs adjacent said gap, said last-named means being apertured to receive the portion of said legs adjacent said gap to allow said gap to be closely spaced to the surface of said record medium as determined by said last-named means.

8. In combination, a rotatable record storage drum having a surface with at least some eccentricity with respect to the axis of rotation of said drum, a transducer head cooperating with said drum and having a shoe with a surface near the periphery of the drum, a housing within which said transducer is positioned, means for fixing the position of said housing relative to the axis of rotation of said drum, said transducer head including a sensing element which is pivotally mounted on said shoe for movement therewith, suporting means for said sensing element and said shoe for resiliently urging said shoe toward the periphery of said drum, said shoe being maintained out of contact with the periphery of said drum but in substantially fixed spaced relation thereto, even though there is some eccentricity of said periphery, by the laminar fluid boundary which adheres to the periphery of said drum during rotation thereof.

9. In combination, a magnetizable record receiving member, housing means, a recording element comprising a coil assembly fixed to said housing and a core structure which is operatively associated with said coil assembly, means including a U-shaped supporting member having a base portion and a pair of spaced apart legs, said base portion being connected to said housing so that it is fixed relative to said coil assembly, the free ends of the legs of said supporting member being secured to said core structure such that said legs are substantially parallel, means pivotally connected to said core structure having a substantial surface which is positioned adjacent said record member, and means for moving said record member rapidly past said core structure for creating a laminar fluid film adherent to said record receiving member which supports the means having said substantial surface in spaced relation from said record receiving member.

10. In combination, a rotatable record storage drum having a surface which has at least some eccentricity with respect to the axis of rotation of the drum, a magnetic head including coil means, first means mounting said coil means in fixed relation to said axis of rotation but variably spaced from said surface as a function of the eccentricity of said surface, said head having a shoe with a surface which is complementary to the surface of said drum, second means mounting said shoe for movement relative to said head so that the surface of said shoe can follow the variations in the surface of said drum by riding on the laminar fluid boundary which adheres to the surface of said drum during rapid rotation thereof, said second means comprising supporting means having resilient spaced apart legs and a core structure which is pivotally connected to said shoe, each of said spaced apart legs having one end thereof connected to said first means and the other end thereof having a pivotal connection to said core structure, said core structure having a gap which is adjacent the surface of said shoe so that it will be positioned closely adjacent but spaced from the surface of said drum during said rapid rotation of said drum, said core structure being positioned adjacent said coil means such that there is a cooperative relationship therewith as said core structure moves relative to said coil means to adjust to the variations in the surface of said drum.

11. In combination, a record storage drum having a surface which has at least some eccentricity relative to the axis of rotation of said drum, a magnetic head comprising a housing which is fixed relative to said drum but variably spaced from said surface as a function of the eccentricity of said surface, shoe means having a surface which is complementary to the surface of said drum, means mounting said shoe means for movement relative to said housing so that said surface can follow the variations in the surface of said drum by riding on the laminar fluid boundary which adheres to the surface of said drum during rapid rotation thereof, the last-named means comprising a U-shaped supporting element having a base portion and substantially parallel legs, means connecting said base portion in fixed relation to said housing, a core structure secured to the free ends of said legs, said shoe means being connected to said core structure, and coil means mounted in said housing operatively associated with said core structure.

12. In combination, a record storage drum having a surface which has at least some eccentricity with respect to the axis of rotation of said drum, a magnetic head comprising a housing which is fixed relative to said drum but variably spaced from said surface as a function of the lack of concentricity of said surface, shoe means having a surface which is complementary to the surface of said drum, means mounting said shoe means for movement relative to said housing so that said substantial surface can follow the variations in the surface of said drum by riding on the laminar fluid boundary which adheres to the surface of said drum during rapid rotation thereof, the last-named means comprising a U-shaped supporting element having a base portion and substantially parallel legs, means fixing said base portion to said housing, a core structure secured to the free ends of said legs, said shoe means being connected to said core structure, means on said housing for restraining movement of said shoe means along the axis of said drum, and coil means in said housing operatively associated with said core structure.

References Cited in the file of this patent

UNITED STATES PATENTS

| | | |
|---|---|---|
| 2,612,566 | Anderson | Sept. 30, 1952 |
| 2,673,249 | Ericsson | Mar. 23, 1954 |
| 2,685,492 | Gabriel | Aug. 3, 1954 |
| 2,761,016 | Muller | Aug. 28, 1956 |
| 2,761,910 | Sher | Sept. 4, 1956 |

FOREIGN PATENTS

| | | |
|---|---|---|
| 739,554 | Great Britain | Nov. 2, 1955 |